United States Patent [19]
Ando

[11] Patent Number: 5,680,242
[45] Date of Patent: Oct. 21, 1997

[54] SCANNING OPTICAL APPARATUS

[75] Inventor: Toshinori Ando, Yokohama, Japan

[73] Assignee: Canon Kabushiki Kaisha, Tokyo, Japan

[21] Appl. No.: 115,245

[22] Filed: Sep. 1, 1993

Related U.S. Application Data

[63] Continuation of Ser. No. 50,991, Apr. 23, 1993, abandoned, which is a continuation of Ser. No. 910,727, Jul. 8, 1992, abandoned.

[30] Foreign Application Priority Data

Jul. 15, 1991 [JP] Japan .................... 3-173951

[51] Int. Cl.$^6$ .................................... G02B 26/08
[52] U.S. Cl. .................... 359/196; 359/217; 359/206; 347/259
[58] Field of Search .................. 359/206, 216, 359/217, 218, 219, 196; 250/235, 236, 234, 548; 356/401; 346/108; 347/259

[56] References Cited

U.S. PATENT DOCUMENTS

| | | | |
|---|---|---|---|
| 4,253,102 | 2/1981 | Kataoka et al. | 346/108 |
| 4,253,724 | 3/1981 | Minoura et al. | 359/218 |
| 4,592,622 | 6/1986 | Hashimoto et al. | 359/218 |
| 4,611,122 | 9/1986 | Nakano et al. | 250/548 |
| 4,669,883 | 6/1987 | Ina et al. | 356/401 |
| 4,687,283 | 8/1987 | Ito et al. | 359/206 |
| 4,722,581 | 2/1988 | Hamada et al. | 359/218 |
| 4,812,861 | 3/1989 | Sasaki et al. | 354/4 |
| 4,878,066 | 10/1989 | Shiraishi | 346/108 |
| 4,902,084 | 2/1990 | Aharon | 359/216 |
| 4,937,459 | 6/1990 | Ina | 250/548 |
| 4,941,719 | 7/1990 | Hisada et al. | 359/205 |
| 4,998,790 | 3/1991 | Iizuka et al. | 359/207 |
| 5,007,692 | 4/1991 | Matsuura | 359/217 |
| 5,126,873 | 6/1992 | Ang | 359/217 |
| 5,210,635 | 5/1993 | Nagata et al. | 359/198 |

FOREIGN PATENT DOCUMENTS

| | | |
|---|---|---|
| 3727961 | 3/1988 | Germany . |
| 61-20848 | 5/1986 | Japan . |
| 3-30843 | 5/1991 | Japan . |

*Primary Examiner*—Georgia Y. Epps
*Assistant Examiner*—Thomas Robbins
*Attorney, Agent, or Firm*—Fitzpatrick, Cella, Harper & Scinto

[57] ABSTRACT

A scanning optical apparatus is provided with a light source, a deflector and an aperture. A light beam generated from the light source is a linearly polarized light the polarized direction of which is inclined by 45° with respect to a plane of deflection of the light beam which is defined to the light beam plane formed by the light beam deflected by the deflectively reflection surface of the deflector with the elapse of time. The light beam is scanned to be deflected by the deflector. The aperture for limiting a diameter of the light beam is arranged between the light source and the deflector.

86 Claims, 5 Drawing Sheets

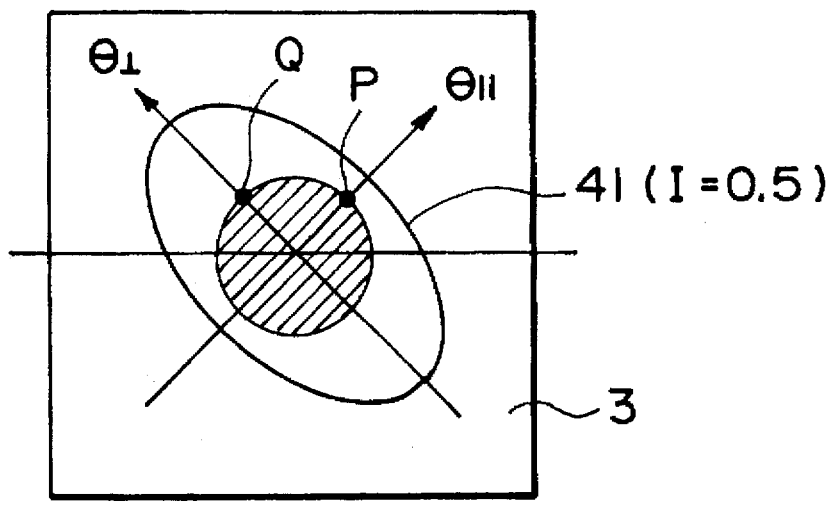
F I G. 4
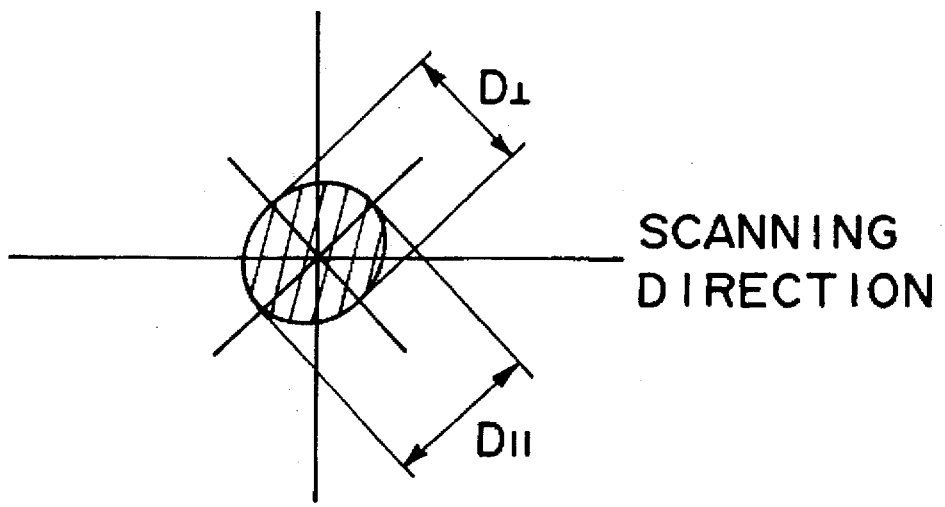
F I G. 5

SCANNING OPTICAL APPARATUS

This application is a continuation, of application Ser. No. 08/050,991 filed Apr. 23, 1993, now abandoned, which was a continuation of application Ser. No. 07/910,727 filed Jul. 8, 1992, now abandoned.

BACKGROUND OF THE INVENTION

1. Field of the Invention

The invention relates to a scanning optical apparatus which is used in a laser beam printer, a laser facsimile apparatus, or the like.

2. Related Background Art

In a scanning optical apparatus which is used in the laser beam printer, laser facsimile apparatus, or the like, a photo sensitive material is scanned by a light beam which has been deflected and scanned by a deflector, thereby forming an electrostatic latent image. The electrostatic latent image is developed to a toner image by a developing apparatus and the toner image is copy transferred onto a recording paper. After that, the toner is thermally fixed to the recording paper by a fixing apparatus after completion of the copy transfer of the toner image, so that the image is printed.

As a light source which is used in such an apparatus, a laser light source is used. In particular, a semiconductor laser is often used to reduce the costs and size of the apparatus. Since a light emitted from the semiconductor laser is a divergent bundle of rays, the emitted light is converted into the parallel laser beam by a collimator lens. The laser beam transmitted through the collimator lens is deflected and scanned by a rotary polygon mirror and, further, passes through several scanning lenses and is formed as an image onto the photo sensitive material as a surface to be scanned and is scanned. Some of such scanning lenses have not only the image forming function to form the parallel laser beam as an image onto the photo sensitive material but also the f-θ function to move an image point (light spot) onto the photo sensitive material at an equal velocity for the laser beam which is deflected at an equal angular velocity and enters the scanning lenses.

Although the laser beam passes through the several lens surfaces and is refracted on its optical path. However, a loss of laser beam also occurs due to the reflection and an energy of the refracted light is reduced by only such an amount of loss.

Generally, since the amount of loss by the reflection varies depending on an incident angle at which the laser beam enters the lens surface, in the laser beam printer, the energy of laser beam fluctuates due to the scanning angle of the laser beam, namely, the position of the scanning line.

In the scanning optical system which is used in the conventional laser beam printer, accordingly, in order to eliminate the angle dependency of a reflectivity of each lens surface, thin optical films of a few layers are evaporation deposited, coated, or the like onto the lens surface, thereby solving such a problem.

However, a thickness of each layer of the thin optical films is extremely thin to be 100 nm or less, an advanced technique is needed to stably coat such a thin optical film onto the lens surface, and there is also a large problem with respect to the stability due to the environment, costs, and the like.

If such a thin film coating is abandoned, unevenness of exposure amounts occurs in the scanned region because of the reasons mentioned above. In the output image, such unevenness results in a blur of a part of a character, so that an image quality is remarkably deteriorated.

SUMMARY OF THE INVENTION

According to the invention, by setting the polarizing direction of a light source for generating a linearly polarized light to an angle of 45° for the plane of deflection (light beam plane which is formed with the elapse of time by a laser beam that is deflected by the deflection reflecting surface of a deflector), transmittance/field angle characteristics of the image forming lens to which the light beam which has been deflected and scanned by the deflector enters are lightened, thereby uniforming an exposure distribution on the photo sensitive material as a scanned surface. Further, by arranging an aperture to limit a diameter of the light beam to a position between the light source and the deflector, an image forming spot of a good shape is formed onto the photo sensitive material.

BRIEF DESCRIPTION OF THE DRAWINGS

FIG. 4 is a diagram showing an intensity of laser beam on an aperture diaphragm;

FIG. 5 is a diagram showing a spot shape;

DETAILED DESCRIPTION OF THE PREFERRED EMBODIMENTS

Figure 1:
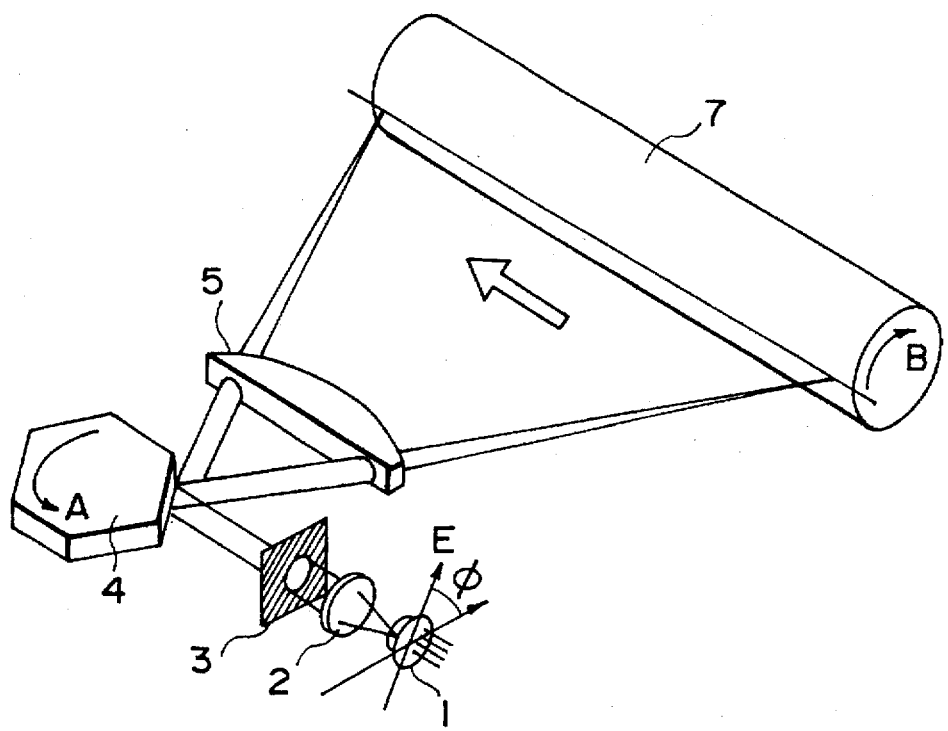
FIG. 1 is a perspective view for explaining a construction of an embodiment of a scanning optical apparatus of the invention.

FIG. 1 is a schematic constructional diagram of a laser recording apparatus using a scanning optical apparatus of the invention.

Reference numeral 1 denotes a semiconductor laser serving as a light source for generating a linearly polarized light beam; 2 a collimator lens for converting the divergent bundle of rays from the light source into almost the parallel light beam; 3 an aperture diaphragm to limit a diameter of the parallel light beam; 4 a rotary polygon mirror as a light deflector which rotates at a constant velocity in the direction indicated by an arrow A; and 5 an f-θ lens as image forming means, for image forming the light beam deflected by the deflection reflecting surface of the polygon mirror 4 onto a photo sensitive material as a recording medium, which will be explained hereinlater, so as to have a spot-like shape. The f-θ lens 5 is designed so as to move the light spot at an equal velocity in accordance with a deflecting angle θ of the polygon mirror. The ON/OFF operation of the semiconductor laser 1 is controlled by a laser driving system (not shown) so that an exposure distribution, which will be explained hereinlater, on the photo sensitive material exhibits characters, an image, or the like.

Reference numeral 7 denotes a photo sensitive material as a surface to be scanned. The photo sensitive material 7 is optically scanned by the foregoing scanning system and rotates at an equal velocity in the B direction around a rotary shaft, thereby forming a two-dimensional exposure distribution onto the surface. An electrostatic copy processing mechanism (not shown) is arranged around the photo sensitive material and an image corresponding to the exposure distribution of the photo sensitive material is formed as a visible image onto a copy transfer material such as a paper or the like in accordance with a well-known process.

Figure 2:
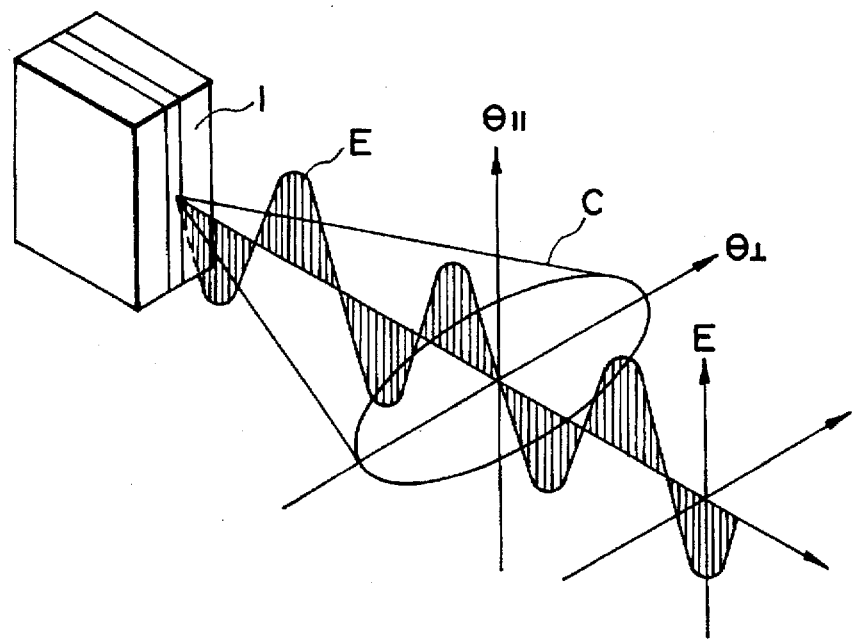
FIG. 2 is a diagram for explaining a laser beam which is emitted from a semiconductor laser.

FIG. 2 shows general characteristics of the output light from the semiconductor laser. An output light beam C of the semiconductor laser is a divergent bundle of rays having a divergent angle which is narrow in the direction ($\theta//$) that is horizontal to a cleavage plane of a laser chip and is wide in the direction ($\theta\perp$) perpendicular to the laser chip cleavage plane. The light beam C is also a linearly polarized light whose polarizing direction (direction E of the electric field) is located in the $\theta//$ direction.

In the invention, the semiconductor laser 1 in FIG. 1 is arranged so that the polarizing direction E is inclined at 45° ($\phi$) for the deflecting surface (light beam plane on which the laser beam that is deflected by the deflection reflecting surface of the deflector is formed with the elapse of time) as shown in FIG. 2.

In the laser beam printer (LBP), it is desirable that the light scan is executed so as to form a uniform exposure distribution in the whole scanning region. When unevenness of the exposure distribution occurs, it appears as a blur of a part of a character in the output image, so that an image quality is remarkably deteriorated. Therefore, in the case such that the light spot is scanned at an equal velocity by the f-$\theta$ lens, it is necessary that an intensity of the laser beam on the photo sensitive material is constant irrespective of the location on the scanning line.

A main factor of the change in intensity of the laser beam which is deflected is that in the image forming lens into which the laser beam enters after it was deflected, namely, in the f-$\theta$ lens in the embodiment, the angle between the incident laser beam and the lens transmitting surface is largely changed by the deflecting direction (hereinafter, referred to as a field angle). Generally, a reflectivity of glass or the like changes in dependence on a refractive index, an incident angle, or a polarizing direction of the incident light.

Figure 3:
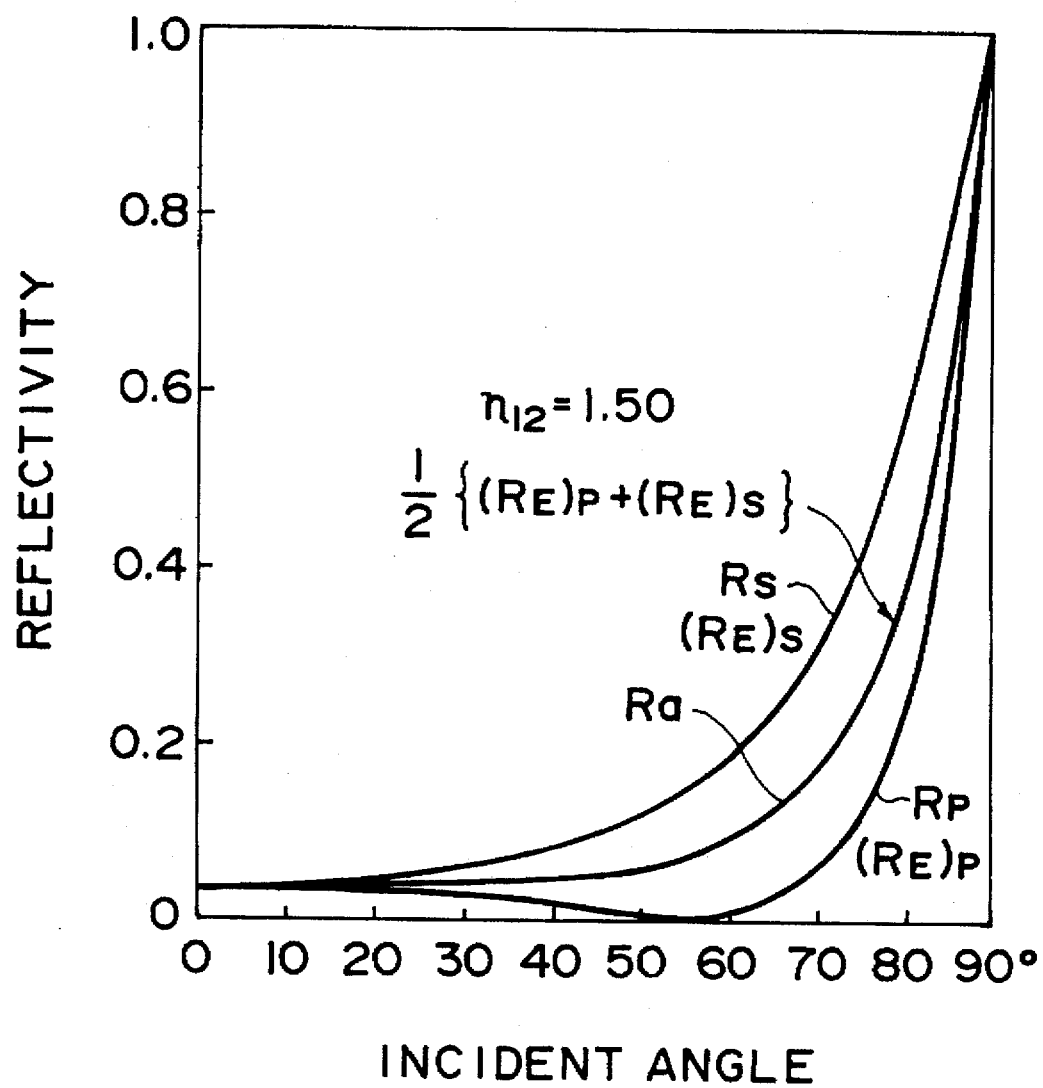
FIG. 3 is a graph showing a reflectivity in case of a refractive index of 1.5.

FIG. 3 shows changes in incident angle and reflection loss when the laser beam enters the transmitting surface of a refractive index of 1.5. The reflection loss differs in accordance with whether the incident light is the S-polarized light or the P-polarized light. In the diagram, $R_s$ shows characteristics for the S-polarized light and $R_p$ indicates characteristics for the P-polarized light.

When the incident light beam at the lens surface is the S-polarized light, that is, when the polarizing direction ($\theta//$) is perpendicular to the reflection cross section (plane in which the incident light, reflected light, and refracted light are included), the reflection loss increases as the field angle is large. On the contrary, when the incident light beam is the P-polarized light, namely, when the polarizing direction is parallel to the reflection cross section, the reflection loss decreases until an incident angle called as Brewster angle at which the loss is equal to 0, and the reflection loss starts to increase in a manner similar to the S-polarized light when the incident angle is larger than the Brewster angle.

Since the image forming optical system has at least two or more refractive planes, those losses are added at the respective planes. In the light beam which is emitted from the final plane of the image forming optical system, an intensity change of about 10 to 20% ordinarily occurs on the axis (scanning angle 0) and in the edge portion of the scanning line. From the deflecting angle and reflectivity angle dependencies mentioned above, in case of the S-polarized light, the exposure amount decreases in the image peripheral portion of a large field angle, and in case of the P-polarized light, the exposure amount increases.

In the invention, as shown in FIG. 1, since the semiconductor laser 1 is arranged so that the polarizing direction is inclined by 45° for the plane of deflection, the reflection loss exhibits angle characteristics as shown in $R_a$ in FIG. 3. There is a relation of $R_a=(R_s+R_p)/2$ among $R_s$, $R_p$, and $R_a$. Thus, the angle characteristics of the reflection loss at each surface of the lenses are almost flat in a range of the incident angle of 0° to 50°, for instance, in case of n=1.5 and the exposure distribution on the photo sensitive material can be made uniform even when there is no coating.

Therefore, a film to prevent the reflection is not coated to at least one or more transmission surfaces among the construction surfaces constructing the f-$\theta$ lens 5.

FIG. 4 shows an intensity distribution of the laser beam at the aperture diaphragm 3 in FIG. 1. Reference numeral 3 denotes the aperture diaphragm member and 41 indicates an equal intensity line of the laser beam from the collimator lens 2. A hatched portion is a circular aperture portion. When the intensity of the laser beam is uniform in the whole region in the aperture portion, a spot occurring due to it has a circular shape. However, the light beam which contributes to actually form an image is the light beam from the collimator lens 2. The equal intensity line 41 of the light beam shows an ellipse having a Major axis in the $\downarrow\perp$ direction and a minor axis in the $\theta//$ direction, namely, the polarizing direction as described in FIG. 2. Thus, laser beam intensities $I_p$ and $I_q$ at peripheral points of the aperture, for instance, at points P and Q are different. The equal intensity line 41 indicates a region of ½ of the intensity at the center of the aperture.

FIG. 5 shows an image forming spot (major axis D//, minor axis D$\perp$) on the photo sensitive material in such the case and the spot has an elliptic shape which is inclined for the scanning direction.

The ellipse of FIG. 5 has an almost circular shape and when the ellipticity is defined to (D//DI)−D$\perp$)/D$\perp$, there is no practical problem when the ellipticity lies within a range of ±10%.

Figure 6:
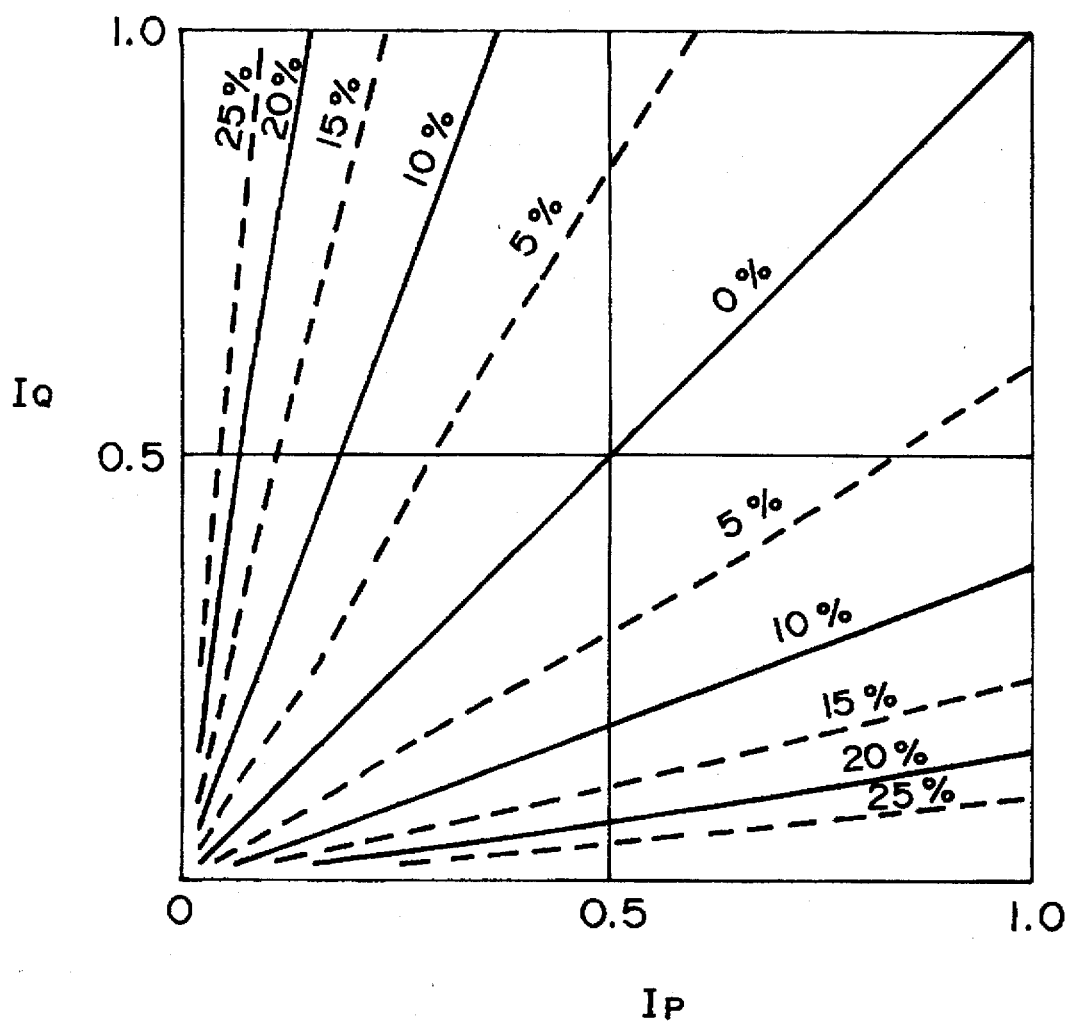
FIG. 6 is a graph showing an intensity and a spot ellipticity on a circular aperture diaphragm.

FIG. 6 is a graph showing the intensities $I_p$ and $I_q$ at points P and Q in FIG. 4 when they are normalized by the maximum intensity at the center of the laser beam and also showing the ellipticity of the image forming spot in FIG. 5. On FIG. 6, solid lines and broken lines represent laser light intensity when varying the ellipticity from 0% to 25%. When both of $I_p$ and $I_q$ are equal to or larger than 0.5, the ellipticity lies within a range of ±10% and no practical problem occurs.

Figure 7:
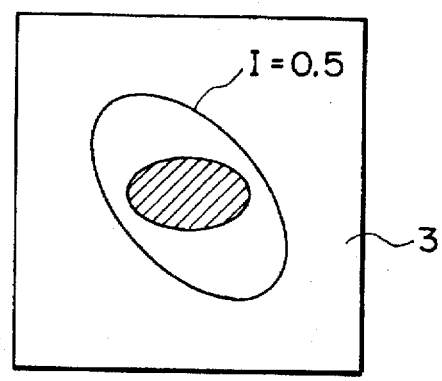
FIG. 7 is a diagram showing a laser intensity distribution on an elliptic aperture diaphragm.
Figure 8:
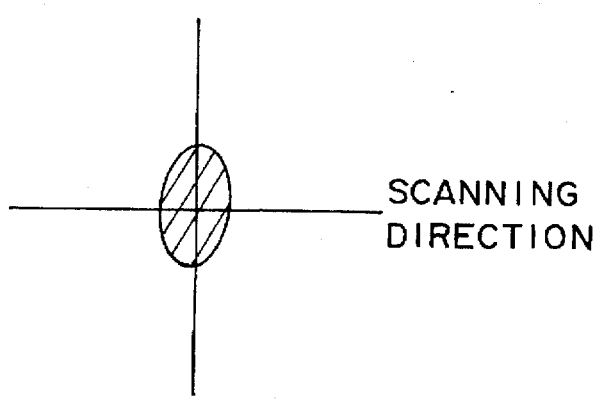
FIG. 8 is a diagram showing a spot shape.

Even when the aperture has an elliptic shape, by setting such that the aperture lies within a region of an intensity of 0.5 or more as shown in FIG. 7, an ellipse which is vertically long is obtained in the direction perpendicular to the scanning direction as a moving direction of the scanning spot as shown in FIG. 8.

That is, it is sufficient that the intensity of light beam at the edge of the aperture of the aperture diaphragm 3 is equal to or larger than ½ of the intensity at the center of the aperture.

According to the embodiment as described above, in order to incline the polarizing direction of the laser beam, the semiconductor laser is rotated by 45° by using the optical axis as a rotational axis. Also, the polarized direction can be inclined by inserting an optical rotatory element or a polarizing plate into the emission light beam or the light beam after it was transmitted through the collimator lens without rotating the semiconductor laser.

Figure 9:
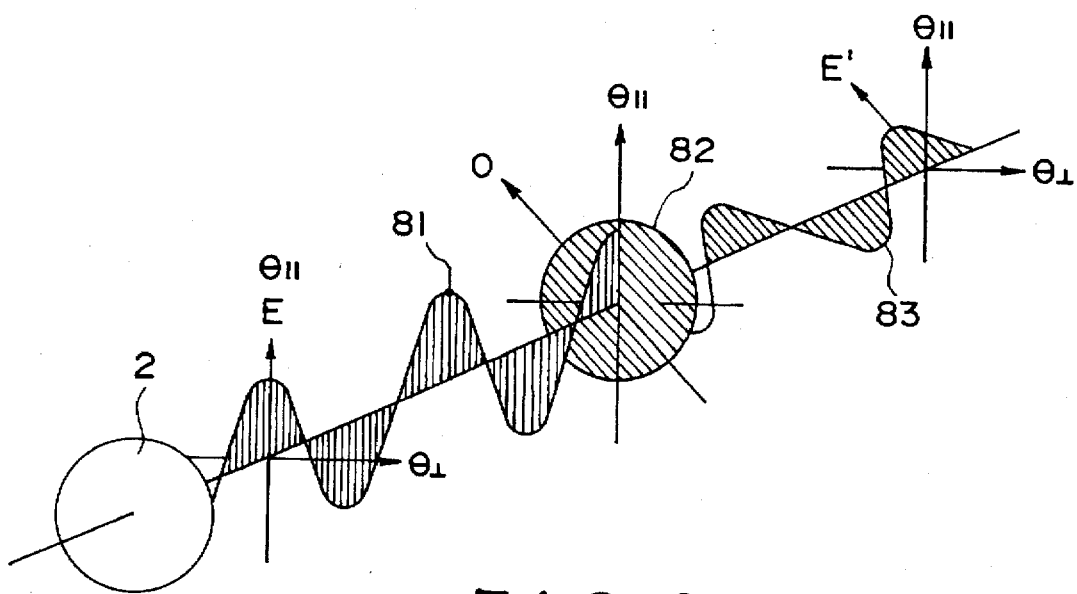
FIG. 9 is a diagram for explaining a state in case of using a polarizing plate.

FIG. 9 is a diagram showing a light beam polarized state in the case where a polarizing plate is provided behind the collimator lens 2. Reference numeral 2 denotes the collimator lens and 81 indicates an electric field vector of the laser beam just after emitted from the collimator. The direction of the electric field vector, namely, the polarizing direction E coincides with the θ// direction. Reference numeral 82 denotes a polarizing plate which is arranged so as to pass only the polarization component in the direction indicated by an arrow O which is inclined by 45° for the direction θ//. Reference numeral 83 denotes an electric field vector of the laser beam just after passed through the polarizing plate. The polarizing direction of the laser beam after it was emitted from the collimator lens coincides with the θ// direction because of the characteristics of the semiconductor laser mentioned above. However, when the laser beam passes through the polarizing plate, only the polarization component in the direction of the O axis remains. Thus, a polarizing direction E' of the laser beam after it passed through the polarizing plate is also included by 45° for the θ// direction in a manner similar to the case of O axis.

As described above, it is possible to provide a laser beam printer using the scanning optical apparatus of low costs in which by inclining the polarizing direction of the laser beam which enters the scanning lens by 45° for the plane of deflection, even when the non-reflective coating of the lens is eliminated or the structure is simplified, the exposure intensity of the scanning line on the photo sensitive material as a surface to be scanned can be uniformed irrespective of the field angle, and by further arranging the aperture to limit the diameter of the light beam to a position between the light source and the deflector, an image forming spot of a good shape can be formed onto the photo sensitive material.

What is claimed is:

1. A scanning optical apparatus comprising:
   a light source for generating a light beam which is a linear polarized light, in which a polarizing direction of the light beam is inclined by an angle of Φ of 45° for a plane of deflection;
   a deflector for deflecting and scanning the light beam from the light source;
   an aperture, arranged between the light source and the deflector, for limiting a diameter of said light beam; and
   optical means for focusing the deflectively scanned light beam from said deflector, wherein said inclination angle Φ is such that reflection loss by said optical means is substantially flat over a scanning angle range of about from 0° to 50°.

2. An apparatus according to claim 1, wherein said light source is a semiconductor laser and the inclination of the polarizing direction is realized by inclining a junction plane of the semiconductor laser for the plane of deflection.

3. An apparatus according to claim 1, wherein an intensity of the light beam at an aperture edge of said aperture is equal to or larger than ½ of an intensity at the center of the aperture.

4. A scanning optical apparatus comprising:
   a light source for generating a light beam which is a linearly polarized light, in which a polarizing direction of said light beam is inclined by an angle of Φ of 45° for a plane of deflection;
   a deflector for deflecting and scanning the light beam from the light source;
   an aperture, arranged between the light source and the deflector, for limiting a diameter of said light beam; and
   an optical system for converging said deflectively scanned light beam to a surface to be scanned, wherein said inclination angle Φ is such that reflection loss by said optical system is substantially flat over a scanning angle range of about from 0° to 50°.

5. An apparatus according to claim 4, wherein a film to prevent the reflection is not coated to at least one or more transmission surfaces locating between said deflector and said surface to be scanned among construction surfaces constructing said optical system.

6. A laser recording apparatus comprising:
   a light source for generating a light beam which is a linearly polarized light, in which a polarizing direction of said light beam is inclined by an angle of Φ of 45° for a plane of deflection;
   a deflector for deflecting and scanning the light beam from the light source;
   an aperture, arranged between the light source and the deflector, for limiting a diameter of the light beam;
   a recording medium for receiving said deflectively scanned light beam; and
   optical means for focusing the deflectively scanned light beam from said deflector, wherein said inclination angle Φ is such that reflection loss by said optical means is substantially flat over a scanning angle range of about from 0° to 50°.

7. An apparatus according to claim 6, wherein said light source is a semiconductor laser and the inclination of said polarizing direction is realized by inclining a junction surface of the semiconductor laser for the plane of deflection.

8. An apparatus according to claim 6, wherein an intensity of the light beam at an aperture edge of said aperture is equal to or larger than ½ of an intensity at the center of the aperture.

9. A laser recording apparatus comprising:
   a light source for generating a light beam which is a linearly polarized light, in which a polarizing direction of said light beam is inclined by an angle of Φ of 45° for a plane of deflection;
   a deflector for deflecting and scanning the light beam from the light source;
   an aperture, arranged between the light source and the deflector, for limiting a diameter of said light beam;
   a recording medium for receiving said deflectively scanned light beam;
   an optical system for converging said deflectively scanned light beam onto said recording medium, wherein said inclination angle Φ is such that reflection loss by said optical system is substantially flat over a scanning angle range of about from 0° to 50°.

10. An apparatus according to claim 9, wherein a film to prevent the reflection is not coated onto at least one or more transmission surfaces locating between said deflector and said recording medium among construction surfaces constructing said optical system.

11. A scanning optical apparatus comprising:
    a light source for generating a light beam which is a linearly polarized light the polarizing direction of which being inclined by an angle Φ with respect to a plane of light beam deflection;
    a deflector for deflectively scanning the light beam from the light source;

an aperture, arranged between the light source and the deflector, for limiting a diameter of the light beam; and optical means for focusing the deflectively scanned light beam from said deflector onto a surface to be scanned, wherein said inclination angle Φ is such that reflection loss by said optical means is substantially flat over a scanning angle range of about from 0° to 50°.

12. An apparatus according to claim 11, wherein the light source is a semiconductor laser and the inclination of the polarizing direction of the light beam is effected by inclining a junction plane of the semiconductor laser with respect to the plane of deflection.

13. An apparatus according to claim 11, wherein an intensity of the light beam at an aperture edge of the aperture is equal to or larger than ½ of an intensity of the light beam at the center of the aperture.

14. A scanning optical comprising:

a light source for generating a light beam which is a linearly polarized light the polarizing direction of which being inclined by an angle Φ with respect to a plane of light beam deflection;

a deflector for deflectively scanning the linearly polarized and inclined light beam from the light source;

an aperture, arranged between the light source and the deflector, for limiting a diameter of the light beam; and optical means for focusing the deflectively scanned light beam from said deflector onto a surface to be scanned, wherein said inclination angle Φ is such that reflection loss by said optical means is substantially flat over a scanning angle range of about from 0° to 50°.

15. An apparatus according to claim 14, wherein the light source is a semiconductor laser and the inclination of the polarizing direction of the light beam is effected by inclining a junction plane of the semiconductor laser with respect to the plane of deflection.

16. An apparatus according to claim 14, wherein an intensity of the light beam at an aperture edge of the aperture is equal to or larger than ½ of an intensity of the light beam at the center of the aperture.

17. A scanning optical apparatus comprising:

a light source for generating a light beam which is a linearly polarized light the polarizing direction of which being inclined by an angle Φ with respect to a plane of light beam deflection;

a deflector for deflectively scanning the light beam from the light source;

an aperture, arranged between the light source and the deflector, for limiting a diameter of the light beam; and an optical system for focusing the light beam deflectively scanned by the deflector onto a surface to be scanned;

wherein said inclination angle Φ is such that reflection loss by said optical system is substantially flat over a scanning angle range of about from 0° to 50°.

18. An apparatus according to claim 17, wherein said optical system includes at least one transmission surface located between the deflector and the surface to be scanned and wherein an antireflection coating is not provided on said at least one transmission surface.

19. A scanning optical apparatus comprising:

a light source for generating a light beam which is a linearly polarized light the polarizing direction of which being inclined by an angle Φ with respect to a plane of light beam deflection;

a deflector for deflectively scanning the linearly polarized and inclined light beam from the light source;

an aperture, arranged between the light source and the deflector, for limiting a diameter of the light beam; and an optical system for focusing the light beam deflectively scanned by the deflector onto a surface to be scanned;

wherein said inclination angle Φ is such that reflection loss by said optical system is substantially flat over a scanning angle range of about from 0° to 50°.

20. An apparatus according to claim 19, wherein said optical system includes at least one transmission surface located between the deflector and the surface to be scanned and wherein an antireflection coating is not provided on said at least one transmission surface.

21. A laser recording apparatus comprising:

a light source for generating a light beam which is a linearly polarized light the polarizing direction of which being inclined by an angle Φ with respect to a plane of light beam deflection;

a deflector for deflectively scanning the light beam from the light source;

an aperture, arranged between the light source and the deflector, for limiting a diameter of the light beam;

a recording medium which receives the light beam deflectively scanned by the deflector; and optical means for focusing the deflectively scanned light beam from said deflector onto said recording medium, wherein said inclination angle Φ is such that reflection loss by said optical means is substantially flat over a scanning angle range of about from 0° to 50°.

22. An apparatus according to claim 21, wherein the light source is a semiconductor laser and the inclination of the polarizing direction of the light beam is effected by inclining a junction plane of the semiconductor laser with respect to the plane of deflection.

23. An apparatus according to claim 21, wherein an intensity of the light beam at an aperture edge of the aperture is equal to or larger than ½ of an intensity of the light beam at the center of the aperture.

24. A laser recording apparatus comprising:

a light source for generating a light beam which is linearly polarized light the polarizing direction of which being inclined by an angle Φ with respect to a plane of light beam deflection;

a deflector for deflectively scanning the linearly polarized and inclined light beam from the light source;

an aperture, arranged between the light source and the deflector, for limiting a diameter of the light beam;

a recording medium which receives the light beam deflectively scanned by the deflector; and optical means for focusing the deflectively scanned light beam from said deflector onto said recording medium, wherein said inclination angle Φ is such that reflection loss by said optical means is substantially flat over a scanning angle range of about from 0° to 50°.

25. An apparatus according to claim 24, wherein the light source is a semiconductor laser and the inclination of the polarizing direction of the light beam is effected by inclining a junction plane of the semiconductor laser with respect to the plane of deflection.

26. An apparatus according to claim 24, wherein an intensity of the light beam at an aperture edge of the aperture is equal to or larger than ½ of an intensity of the light beam at the center of the aperture.

27. A laser recording apparatus comprising:

a light source for generating a light beam which is linearly polarized light the polarizing direction of which being inclined by an angle Φ with respect to a plane of light beam deflection;

a deflector for deflectively scanning the linearly polarized and inclined light beam from the light source;

an aperture, arranged between the light source and the deflector, for limiting a diameter of the light beam;

a recording medium which receives the light beam deflectively scanned by the deflector; and optical means for focusing the deflectively scanned light beam from said deflector onto said recording medium, wherein said inclination angle Φ is such that reflection loss by said optical means is substantially flat over a scanning angle range of about from 0° to 50°.

28. An apparatus according to claim 27, wherein said optical system includes at least one transmission surface located between the deflector and the recording medium and wherein an antireflection coating is not provided on said at least one transmission surface.

29. A laser recording apparatus comprising:

a light source for generating a light beam which is a linearly polarized light the polarizing direction of which being inclined by an angle Φ with respect to a plane of light beam deflection;

a deflector for deflectively scanning the light beam from the light source;

an aperture, arranged between the light source and the deflector, for limiting a diameter of the light beam;

a recording medium which receives the light beam deflectively scanned by the deflector; and an optical system for focusing the light beam deflectively scanned by the deflector onto the recording medium;

wherein said inclination angle Φ is such that reflection loss by said optical system is substantially flat over a scanning angle range of about from 0° to 50°.

30. An apparatus according to claim 29, wherein said optical system includes at least one transmission surface located between the deflector and the recording medium and wherein an antireflection coating is not provided on said at least one transmission surface.

31. A scanning method in a scanning optical apparatus comprising the steps of:

generating a linearly polarized light beam whose polarizing direction is inclined by an angle Φ with respect to a plane of light beam deflection;

deflectively scanning the light beam the polarizing direction of which is inclined, by a deflector;

limiting a diameter of the light beam incident on the deflector with an aperture; and focusing the deflectively scanned light beam with optical means onto a surface to be scanned, and setting the inclination angle Φ such that reflection loss by said optical means is substantially flat over a scanning angle of about from 0° to 50°.

32. A method according to claim 31, wherein the polarizing direction of the light beam is inclined by 45° with respect to the plane of deflection.

33. A method according to claim 31, wherein the light beam is generated by a semiconductor laser and the inclination of the polarizing direction of the light beam is effected by inclining a junction plane of the semiconductor laser with respect to the plane of deflection.

34. A method according to claim 31, wherein an intensity of the light beam at an aperture edge of the aperture is equal to or larger than ½ of an intensity of the light beam at the center of the aperture.

35. A scanning method in a scanning optical apparatus, comprising the steps of:

generating a linearly polarized light beam whose polarizing direction is inclined by an angle Φ with respect to a plane of light beam deflection;

deflectively scanning the light beam, the polarizing direction of which is inclined, by a deflector;

limiting a diameter of the light beam incident on the deflector with an aperture; and focusing the light beam deflectively scanned by the deflector onto a surface to be scanned;

wherein said focusing step includes focusing with optical means, and further comprising the step of setting the inclination angle Φ such that reflection loss by said optical means is substantially flat over a scanning angle range of about from 0° to 50°.

36. A method according to claim 35, wherein said converging step includes the step of transmitting the deflectively scanned light beam using at least one transmission surface located between the deflector and the surface to be scanned and wherein an antireflection coating is not provided on said at least one transmission surface.

37. A recording method in a laser recording apparatus, comprising the steps of:

generating a linearly polarized light beam whose polarizing direction is inclined by an angle Φ with respect to a plane of light beam deflection;

deflectively scanning the light beam, the polarizing direction of which is inclined, by a deflector;

limiting a diameter of the light beam incident on the deflector with an aperture;

scanning a recording medium with the light beam deflectively scanned by the deflector; and focusing the deflectively scanned light beam onto the recording medium with optical means, and setting the inclination angle Φ such that reflection loss by said optical means is substantially flat over a scanning angle of about from 0° to 50°.

38. A method according to claim 37, wherein the polarizing direction of the light beam is inclined by 45° with respect to the plane of deflection.

39. A method according to claim 37, wherein the light beam is generated by a semiconductor laser and the inclination of the polarizing direction of the light beam is effected by inclining a junction plane of the semiconductor laser with respect to the plane of deflection.

40. A method according to claim 37, wherein an intensity of the light beam at an aperture edge of the aperture is equal to or larger than ½ of an intensity of the light beam at the center of the aperture.

41. A recording method in a laser recording apparatus, comprising the steps of:

generating a linearly polarized light beam whose polarizing direction is inclined by an angle Φ with respect to a plane of light beam deflection;

deflectively scanning the light beam, the polarizing direction of which is inclined with respect to the plane of deflection, by a deflector;

limiting a diameter of the light beam incident on the deflector with an aperture; and focusing the light beam deflectively scanned by said deflector onto the recording medium;

wherein said focusing step includes focusing with optical means onto the recording medium, and further comprising the step of setting the inclination angle Φ such that reflection loss by said optical means is substantially flat over a scanning angle range of about from 0° to 50°.

42. A method according to claim 41, wherein said converging step includes the step of transmitting the deflectively scanned light beam using at least one transmission surface located between the reflector and the recording medium and wherein an antireflection coating is not provided on said at least one transmission surface.

43. A scanning optical apparatus comprising:

a light source for generating a light beam which is a linearly polarized light the polarizing direction of which is inclined by an angle Φ with respect to a plane of light beam deflection;

a deflector for defectively scanning the light beam from the light source;

an aperture, arranged between the light source and the deflector, for limiting a size of the light beam; and optical means for focusing the deflectively scanned light beam from said deflector onto a surface to be scanned, wherein said inclination angle Φ is such that reflection loss by said optical means is substantially flat over a scanning angle range of about from 0° to 50°.

44. An apparatus according to claim 43, wherein the light source is a semiconductor laser and the inclination of the polarizing direction of the light beam is effected by including a junction plane of the semiconductor laser with respect to the plane of deflection.

45. An apparatus according to claim 43, wherein an intensity of the light beam at an aperture edge of the aperture is equal to or larger than ½ of an intensity of the light beam at the center of the aperture.

46. A scanning optical apparatus comprising:

a light source for generating a light beam which is a linearly polarized light;

a deflector for defectively scanning the light beam from the light source, the polarizing direction of the light beam which is incident on the deflector being inclined by an angle Φ with respect to a plane of light beam deflection, the light beam incident on the deflector including P-polarized light and S-polarized light;

an aperture, arranged between the light source and the deflector, for limiting a size of the light beam; and optical means for focusing the deflectively scanned light beam from said deflector onto a surface to be scanned, wherein said inclination angle Φ is such that reflection loss by said optical means is substantially flat over a scanning angle range of about from 0° to 50°.

47. An apparatus according to claim 46, wherein the light source is a semiconductor laser and the inclination of the polarizing direction of the light beam is effected by inclining a junction plane of the semiconductor laser with respect to the plane of deflection.

48. An apparatus according to claim 46, wherein an intensity of the light beam at an aperture edge of the aperture is equal to or larger than ½ of an intensity of the light beam at the center of the aperture.

49. A scanning optical apparatus comprising:

a light source for generating a light beam which is a linearly polarized light the polarizing direction of which is inclined by an angle Φ with respect to a plane of light beam deflection;

a deflector for defectively scanning the light beam from the light source;

an aperture, arranged between the light source and the deflector, for limiting a size of the light beam; and an optical system for focusing the light beam defectively scanned by the deflector on a surface to be scanned;

wherein said inclination angle Φ is such that reflection loss by said optical system is substantially flat over a scanning angle range of about from 0° to 50°.

50. An apparatus according to claim 49, wherein said optical system includes at least one transmission surface located between the deflector and the surface to be scanned and wherein an antireflection coating is not provided on said at least one transmission surface.

51. A scanning optical apparatus comprising:

a light source for generating a light beam which is a linearly polarized light;

a deflector for defectively scanning the light beam from the light source, the polarizing direction of the light beam which is incident on the deflector being inclined by an angle Φ with respect to a plane of light beam deflection, the light beam incident on the deflector including a P-polarized light and S-polarized light;

an aperture, arranged between the light source and deflector, for limiting a size of the light beam; and an optical system for focusing the light beam defectively scanned by the deflector onto a surface to be scanned;

wherein said inclination angle Φ is such that reflection loss by said optical system is substantially flat over a scanning angle range of about from 0° to 50°.

52. An apparatus according to claim 51, wherein said optical system includes at least one transmission surface located between the deflector and the surface to be scanned and wherein an antireflection coating is not provided on said at least one transmission surface.

53. A laser recording apparatus comprising:

a light source of generating a light beam which is a linearly polarized light the polarizing direction of which is inclined by an angle Φ with respect to a plane of light beam deflection;

a deflector for defectively scanning the light beam from the light source;

an aperture, arranged between the light source and the deflector, for limiting a size of the light beam;

a recording medium which receives the light beam defectively scanned by the deflector; and optical means for focusing the deflectively scanned light beam from said deflector onto said recording medium, wherein said inclination angle Φ is such that reflection loss by said optical means is substantially flat over a scanning angle range of about from 0° to 50°.

54. An apparatus according to claim 53, wherein the light source is a semiconductor laser and the inclination of the polarizing direction of the light beam is effected by including a junction plane of the semiconductor laser with respect to the plane of deflection.

55. An apparatus according to claim 53, wherein an intensity of the light beam at an aperture edge of the aperture is equal to or larger than ½ of an intensity of the light beam at the center of the aperture.

56. A laser recording apparatus comprising:

a light source for generating a light beam which is a linearly polarized light;

a deflector for defectively scanning the light beam from the light source, the polarizing direction of the light beam which is incident on the deflector being inclined by an angle Φ with respect to a plane of light beam deflection, the light beam incident on the deflector including P-polarized light and S-polarized light;

an aperture, arranged between the light source and the deflector, for limiting a size of the light beam;

a recording medium which receives the light beam defectively scanned by the deflector; and optical means for focusing the deflectively scanned light beam from said deflector onto said recording medium, wherein said inclination angle Φ is such that reflection loss by said optical means is substantially flat over a scanning angle range of about from 0° to 50°.

57. An apparatus according to claim 56, wherein the light source is a semiconductor laser and the inclination of the polarizing direction of the light beam is effected by inclining a junction pale of the semiconductor laser with respect to the plane of deflection.

58. An apparatus according to claim 56, wherein an intensity of the light beam at an aperture edge of the aperture is equal to or larger than ½ of an intensity of the light beam at the center of the aperture.

59. A laser recording apparatus comprising:

a light source for generating a light beam which is a linearly polarized light the polarizing direction of which is inclined by an angle Φ with respect to a plane of light beam deflection;

a deflector for defectively scanning the light beam form the light source;

an aperture, arranged between the light source and the deflector, for limiting a size of the light beam;

a recording medium which receives the light beam defectively scanned by the deflector; and an optical system for focusing the light beam defectively scanned by the deflector onto the recording medium;

wherein said inclination angle Φ is such that reflection loss by said optical system is substantially flat over a scanning angle range of about from 0° to 50°.

60. An apparatus according to claim 59, wherein said optical system includes at last one transmission surface located between the deflector and the recording medium and wherein an antireflection coating is not provided on said at least one transmission surface.

61. A laser recording apparatus comprising:

a light source for generating a light beam which is a linearly polarized light;

a deflector for defectively scanning the light beam form the light source, the polarizing direction of the light beam which is incident on the deflector being inclined by an angle Φ with respect to a plane of light beam deflection, the light beam incident on the deflector including a P-polarized light and S-polarized light;

an aperture, arranged between the light source and deflector, for limiting a size of the light beam;

a recording medium which receives the light beam defectively scanned by the deflector; and an optical system for focusing the light beam defectively scanned by the deflector onto the recording medium;

wherein said inclination angle Φ is such that reflection loss by said optical system is substantially flat over a scanning angle range of about from 0° to 50°.

62. An apparatus according to claim 61, wherein said optical system includes at least one transmission surface located between the deflector and the recording medium and wherein an antireflection coating is not provided on said at least one transmission surface.

63. A scanning method in a scanning optical apparatus comprising the steps of:

generating a light beam which is a linearly polarized light the polarizing direction of which is inclined by an angle Φ with respect to a plane of light beam deflection;

defectively scanning the light beam, the polarizing direction of which is inclined, by a deflector;

providing an aperture for limiting a size of the light beam incident on the deflector; and focusing the deflectively scanned light beam with optical means onto a surface to be scanned, and setting the inclination angle Φ such that reflection loss by said optical means is substantially flat over a scanning angle of about from 0° to 50°.

64. A method according to claim 63, wherein the polarizing direction of the light beam is inclined by 45° with respect to the plane of deflection.

65. A method according to claim 63, wherein the light beam is generated by a semiconductor laser and the inclination of the polarizing direction of the light beam is effected by inclining a junction plane of the semiconductor laser with respect to the plane of deflection.

66. A method according to claim 63, wherein an intensity of the light beam at an aperture edge of the aperture is equal to or larger then ½ of an intensity of the light beam at the center of the aperture.

67. A scanning method in a scanning optical apparatus comprising the steps of:

generating a light beam which is a linearly polarized light the polarizing direction of which is inclined by an angle Φ with respect to a plane of light beam deflection;

defectively scanning the light beam, the polarizing direction of which is inclined by a deflector;

providing an aperture for limiting a size of the light beam incident on the deflector; and focusing the deflectively scanned light beam onto the recording medium with optical means onto a surface to be scanned, and setting the inclination angle Φ such that reflection loss by said optical means is substantially flat over a scanning angle of about from 0° to 50°.

68. A method according to claim 67, wherein said optical system includes at least one transmission surface located between the deflector and the surface to be scanned and wherein an antireflection coating is not provided on said at least one transmission surface.

69. A recording method in a laser recording apparatus comprising the steps of:

generating a light beam which is a linearly polarized light the polarizing direction of which is inclined by an angle Φ with respect to a plane of light beam deflection;

defectively scanning the light beam, the polarizing direction of which is inclined, by a deflector;

providing an aperture for limiting a size of the light beam incident on the deflector;

scanning a recording medium with the light beam defectively scanned by the deflector; and focusing the deflectively scanned light beam onto the recording medium with optical means, and setting the inclination angle Φ such that reflection loss by said optical means is substantially flat over a scanning angle of about from 0° to 50°.

70. A method according to claim 69, wherein the polarizing direction of the light beam is inclined by 45° with respect to the plane of deflection.

71. A method according to claim 69, wherein the light beam is generated by a semiconductor laser and the inclination of the polarizing direction of the light beam is effected by inclining a junction plane of the semiconductor laser with respect to the plane of deflection.

72. A method according to claim 69, wherein an intensity of the light beam at an aperture edge of the aperture is equal to or large than ½ of an intensity of the light beam at the enter of the aperture.

73. A recording method in a laser recording apparatus comprising the steps of:

generating a light beam which is a linearly polarized light the polarizing direction of which is inclined by an angle Φ with respect to a plane of light beam deflection;

defectively scanning the light beam, the polarizing direction of which is inclined by a deflector;

providing an aperture for limiting a size of the light beam incident on the deflector; and focusing the light beam defectively scanned by the deflector onto a recording medium by an optical system;

wherein said focusing step includes focusing with optical means onto the recording medium, and further comprising the step of setting the inclination angle Φ such that reflection loss by said optical system is substantially flat over a scanning angle range of about from 0° to 50°.

74. A method according to claim 73, wherein said optical system includes at least one transmission surface located between the deflector and the recording medium and wherein an antireflection coating is not provided on said at least one transmission surface.

75. A scanning method in an optical scanning apparatus comprising the steps of:

generating a light beam which is a linearly polarized light and inclining the polarizing direction of the light beam by an angle Φ with respect to a plane of light beam deflection;

defectively scanning the light beam the polarizing direction of which is inclined and which includes P-polarized light and S-polarized light by a deflector;

providing an aperture for limiting a size of the light beam incident on the deflector; and focusing the deflectively scanned light beam with optical means onto a surface to be scanned, and setting the inclination angle Φ such that reflection loss by said optical means is substantially flat over a scanning angle of about from 0° to 50°.

76. A method according to claim 75, wherein the polarizing direction of the light beam is inclined by 45° with respect to the plane of deflection.

77. A method according to claim 75, wherein the light beam is generated by a semiconductor laser and the inclination of the polarizing direction of the light beam is effected by including a junction plane of the semiconductor laser with respect to the plane of deflection.

78. A method according to claim 75, wherein an intensity of the light beam at an aperture edge of the aperture is equal to or larger than ½ of an intensity of the light beam at the center of the aperture.

79. A scanning method in an optical scanning apparatus comprising the steps of:

generating a light beam which is a linearly polarized light and inclining the polarizing direction of the light beam by an angle Φ with respect to a plane of light beam deflection;

defectively scanning the light beam, the polarizing direction of which is inclined and which includes P-polarized light and S-polarized light, by a deflector;

providing an aperture for limiting a size of the light beam incident on the deflector; and focusing the light beam defectively scanned by the deflector onto a surface to be scanned by an optical system;

wherein said focusing step includes focusing with optical means, and further comprising the step of setting the inclination angle Φ such that reflection loss by said optical means is substantially flat over a scanning angle range of about from 0° to 50°.

80. A method according to claim 79, wherein said optical system includes at least one transmission surface located between the deflector and the surface to be scanned and wherein an antireflection coating is not provided on said at least one transmission surface.

81. A recording method in a laser recording apparatus comprising the steps of:

generating a light beam which is a linearly polarized light and inclining the polarizing direction of the light beam by an angle Φ with respect to a plane of light beam deflection;

defectively scanning the light beam, the polarizing direction of which is inclined and which includes P-polarized light and S-polarized light, by a deflector;

providing an aperture for limiting a size of the light beam incident on the deflector;

scanning a recording medium with the light beam defectively scanned by the deflector; and focusing the deflectively scanned light beam with optical means onto the recording medium, and setting the inclination angle Φ such that reflection loss by said optical means is substantially flat over a scanning angle of about from 0° to 50°.

82. A method according to claim 81, wherein the polarizing direction of the light beam is inclined by 45° with respect to the plane of deflection.

83. A method according to claim 81, wherein the light beam is generated by a semiconductor laser and the inclination of the polarizing direction of the light beam is effected by inclining a junction plane of the semiconductor laser with respect to the plane of deflection.

84. A method according to claim 81, wherein an intensity of the light beam at an aperture edge of the aperture is equal to or larger than ½ of an intensity of the light beam at the center of the aperture.

85. A recording method in a laser recording apparatus comprising the steps of:

generating a light beam which is a linearly polarized light and inclining the polarizing direction of the light beam by an angle Φ with respect to a plane of light beam deflection;

defectively scanning the light beam, the polarizing direction of which is inclined and which includes P-polarized light and S-polarized light, by a deflector;

providing an aperture for limiting a size of the light beam incident on the deflector; and focusing the light beam defectively scanned by the deflector onto a recording medium by an optical system;

wherein said focusing step includes focusing with optical means onto the recording medium, and further comprising the step of setting the inclination angle Φ such that reflection loss by said optical means is substantially flat over a scanning angle range of about from 0° to 50°.

86. A method according to claim 85, wherein said optical system includes at least one transmission surface located between the deflector and the recording medium and wherein an antireflection coating is not provided on said at least one transmission surface.

* * * * *